US012686757B2

(12) United States Patent
Satta et al.

(10) Patent No.: US 12,686,757 B2
(45) **Date of Patent: \*Jul. 21, 2026**

(54) RHEOLOGY CONTROL AGENT AND CURABLE COMPOSITION USING THE SAME

(71) Applicant: KUSUMOTO CHEMICALS, LTD., Tokyo (JP)

(72) Inventors: Yusuke Satta, Saitama (JP); Kyohei Nakano, Saitama (JP); Kenji Fukui, Saitama (JP)

(73) Assignee: KUSUMOTO CHEMICALS, LTD., Tokyo (JP)

( * ) Notice: Subject to any disclaimer, the term of this patent is extended or adjusted under 35 U.S.C. 154(b) by 662 days.

This patent is subject to a terminal disclaimer.

(21) Appl. No.: 18/016,875

(22) PCT Filed: Jul. 29, 2021

(86) PCT No.: PCT/JP2021/028151
§ 371 (c)(1),
(2) Date: Apr. 28, 2023

(87) PCT Pub. No.: WO2022/025203
PCT Pub. Date: Feb. 3, 2022

(65) Prior Publication Data
US 2023/0257551 A1 Aug. 17, 2023

(30) Foreign Application Priority Data
Jul. 31, 2020 (JP) ................................. 2020-130219

(51) Int. Cl.
| *C08K 5/20* | (2006.01) |
| *C08G 69/26* | (2006.01) |
| *C08J 3/22* | (2006.01) |
| *C08L 83/04* | (2006.01) |

(52) U.S. Cl.
CPC ............... *C08K 5/20* (2013.01); *C08G 69/26* (2013.01); *C08J 3/226* (2013.01); *C08L 83/04* (2013.01); *C08J 2377/08* (2013.01); *C08L 2310/00* (2013.01)

(58) Field of Classification Search
None
See application file for complete search history.

(56) References Cited

U.S. PATENT DOCUMENTS

| | | | | |
|---|---|---|---|---|
| 4,128,436 A | * | 12/1978 | O'Hara | C09D 7/43 |
| | | | | 524/904 |
| 5,180,802 A | | 1/1993 | Hartman et al. | |
| 7,910,652 B2 | * | 3/2011 | Schwitter | C08L 77/02 |
| | | | | 524/451 |
| 2002/0103287 A1 | * | 8/2002 | Koning | C08L 77/02 |
| | | | | 524/494 |
| 2005/0176880 A1 | | 8/2005 | Fujii et al. | |
| 2008/0153924 A1 | * | 6/2008 | Caron | C08K 5/0016 |
| | | | | 106/504 |
| 2012/0125235 A1 | * | 5/2012 | Azeyanagi | C08G 69/34 |
| | | | | 106/504 |
| 2015/0274644 A1 | * | 10/2015 | Bernard | C08K 5/20 |
| | | | | 554/56 |
| 2016/0168079 A1 | | 6/2016 | Bernard | |
| 2017/0022402 A1 | | 1/2017 | Lutz et al. | |
| 2020/0354545 A1 | | 11/2020 | Bernard et al. | |
| 2022/0135798 A1 | | 5/2022 | Nakano et al. | |

FOREIGN PATENT DOCUMENTS

| | | |
|---|---|---|
| CN | 1654570 A | 8/2005 |
| JP | 56-112977 A | 9/1981 |
| JP | S63-145332 A | 6/1988 |
| JP | 4-236225 A | 8/1992 |
| JP | 2002-322379 A | 11/2002 |
| JP | 2011-79887 A | 4/2011 |
| JP | 2016-530245 A | 9/2016 |
| JP | 2017-518391 A | 7/2017 |
| TW | 200838907 A | 10/2008 |

(Continued)

OTHER PUBLICATIONS

International Search Report and Written Opinion mailed on Nov. 22, 2021, received for PCT Application PCT/JP2021/028151, filed on Jul. 29, 2021, 10 pages including English Translation.
Office Action issued on Apr. 13, 2023, in corresponding Taiwanese patent Application No. 110127892, 13 pages.
Office Action issued on Aug. 7, 2023, in corresponding Chinese patent Application No. 202180031350.2, 20 pages.
Office Action issued Jan. 22, 2024 in Korean Patent Application No. 10-2022-7034476, 9 pages.

*Primary Examiner* — Katarzyna I Kolb
(74) *Attorney, Agent, or Firm* — XSENSUS LLP

(57) ABSTRACT

A rheology control agent for a curable composition may include: a diamide compound (A) and/or a hydrogenated castor oil (A'), the diamide compound (A) being obtained by condensation reaction between a diamine component (A1) and a monocarboxylic acid component (A2); and a polyamide compound (B) obtained by polycondensation of an amine component (B1) and a carboxylic acid component (B2). The diamine component (A1) may be selected from the group consisting of diamines with 2 to 12 carbon atoms. The monocarboxylic acid component (A2) may be selected from the group consisting of hydrogenated castor oil fatty acids and linear saturated fatty acids. The polyamide compound (B) may have a weight-average molecular weight from 2,000 to 21,000. A cured product of the curable composition may be used for a sealant or an adhesive.

16 Claims, 1 Drawing Sheet

(56)     References Cited

FOREIGN PATENT DOCUMENTS

| | | |
|---|---|---|
| TW | 201925164  A | 7/2019 |
| WO | 2020/158252  A1 | 8/2020 |

* cited by examiner

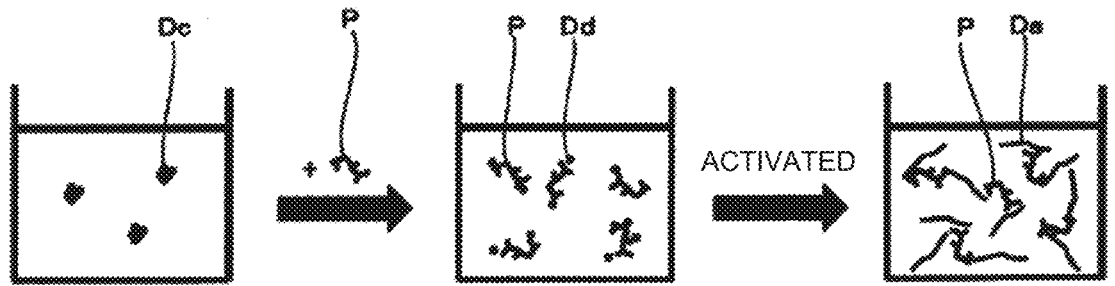

RHEOLOGY CONTROL AGENT AND CURABLE COMPOSITION USING THE SAME

CROSS-REFERENCE TO RELATED APPLICATIONS

The present application is based on PCT filing PCT/JP2021/028151, filed Jul. 29, 2021, which claims priority to JP 2020-130219, filed Jul. 31, 2020, the entire contents of each are incorporated herein by reference.

TECHNICAL FIELD

The present invention relates to a rheology control agent and a curable composition using the same.

BACKGROUND ART

As a rheology control agent (thickener) for curable compositions such as sealants, adhesives, and the like, a fine powder of hydrogenated castor oil, fatty acid diamide, or the like is typically used (for example, see PTL 1). When heated or sheared in a medium such as a resin or a solvent, the fine powder changes its form into an acicular shape to exhibit a rheology modifying effect (hereinafter, the change into acicular shape to enable the rheology control agent to exhibit the rheology control modifying effect is referred to as "activation").

CITATION LIST

Patent Literature

[PTL 1] JPS56112977 A

SUMMARY OF THE INVENTION

Technical Problem

The above rheology control agent is typically added in production of curable compositions such as sealants, adhesives, or the like (specifically, at the time of mixing a resin, a plasticizer, a filler, or the like), and partially activated by heat produced by kneading and applied during kneading. However, the curable compositions such as sealants, adhesives, or the like may be produced at a low temperature such as 50° C. or less. Therefore, when a fine powder of hydrogenated castor oil, fatty acid diamide, or the like is used as a rheology control agent, the amount of heat required for activation becomes insufficient, making it difficult to sufficiently activate the rheology control agent added to the curable composition. As a result, the curable composition containing the rheology control agent may have low initial viscosity.

Such low initial viscosity of the curable composition reduces the performance (rheology modifying effect) originally expected from the rheology control agent, and causes a problem of deterioration in handleability and applicability of the curable composition. Such a problem may be solved by a technique of increasing the production temperature for enhancing the initial viscosity of the curable composition. However, this technique uses a large amount of energy for increasing the production temperature, which increases the cost of the curable composition and adversely affects the environment.

The present invention has been made in view of the above circumstances, and has an object to provide a rheology control agent capable of preventing deterioration in handleability and applicability caused by insufficient activation of the rheology control agent in use of a curable composition produced under low-temperature conditions and reducing the amount of energy used in production, and further has an object to provide a curable composition containing the rheology control agent.

Solution to Problem

As a result of intensive research to achieve the above objects, the present inventors have found that using a composition obtained by mixing specific fatty acid diamides and/or hydrogenated castor oil with specific polyamide compounds as a rheology control agent makes it possible to sufficiently activate the rheology control agent even under low-temperature conditions such as in production of sealants, adhesives, or the like to thereby prevent deterioration in handleability and applicability of the rheology control agent caused by low initial viscosity of the curable composition and reduce the amount of energy used in production. The present invention has been made based on these findings.

That is, an aspect of the present invention is a rheology control agent for a curable composition, the rheology control agent including: a diamide compound (A) and/or a hydrogenated castor oil (A'), the diamide compound (A) being obtained by condensation reaction between a diamine component (A1) and a monocarboxylic acid component (A2), the diamine component (A1) being selected from the group consisting of diamines with 2 to 12 carbon atoms, and the monocarboxylic acid component (A2) being selected from the group consisting of hydrogenated castor oil fatty acids and linear saturated fatty acids; and a polyamide compound (B) obtained by polycondensation of an amine component (B1) and a carboxylic acid component (B2), wherein the amine component (B1) contains at least one amine selected from the group consisting of diamines with 2 to 54 carbon atoms and triamines with 2 to 54 carbon atoms, the carboxylic acid component (B2) contains at least one carboxylic acid selected from the group consisting of dicarboxylic acids with 4 to 54 carbon atoms and tricarboxylic acids with 4 to 54 carbon atoms, the polyamide compound (B) is a polyamide obtained by polycondensation of at least one of the amine component (B1) containing polymerized fatty acid derivatives and the carboxylic acid component (B2) containing polymerized fatty acids, the polyamide compound (B) has a weight-average molecular weight of 2,000 or more and 21,000 or less, and a cured product of the curable composition is used for a sealant or an adhesive.

In the above aspect of the present invention, the rheology control agent preferably contains 1 mass % or more and 50 mass % or less of the polyamide compound (B) when a total amount of the polyamide compound (B) and at least one of the diamide compound (A) and the hydrogenated castor oil (A') is 100 mass %.

In the above aspect of the present invention, the diamine component (A1) is preferably a diamine with 2 to 8 carbon atoms.

In the above aspect of the present invention, the rheology control agent preferably contains at least the hydrogenated castor oil (A').

In this case, a content of the hydrogenated castor oil (A') is preferably 10 mass % or more when a total amount of the diamide compound (A) and the hydrogenated castor oil (A') is 100 mass %.

In the above aspect of the present invention, the carboxylic acid component (B2) may contain at least polymerized fatty acids.

In the above aspect of the present invention, a reaction molar ratio (B1/B2) between the amine component (B1) and the carboxylic acid component (B2) may be less than 1.

Another aspect of the present invention is a curable composition including: the rheology control agent described above; and a binder.

Effect of the Invention

According to the present invention, in which the rheology control agent contains a specific diamide compound and/or hydrogenated castor oil mixed with a specific polyamide compound, it is possible to sufficiently activate the rheology control agent even under low-temperature conditions such as in production of sealants, adhesives, or the like to thereby prevent deterioration in handleability and applicability of the rheology control agent caused by low initial viscosity of the curable composition.

BRIEF DESCRIPTION OF THE DRAWINGS

FIG. 1 is a schematic diagram illustrating a mechanism by which a polyamide compound (B) disperses aggregates of a diamide compound (A) and/or a hydrogenated castor oil (A') to promote activation of the diamide compound (A) and/or the hydrogenated castor oil (A').

DESCRIPTION OF THE EMBODIMENTS

A preferred embodiment of the present invention will now be described in detail with reference to the drawings as necessary.

[Rheology Control Agent]

A rheology control agent according to the present invention is an additive for use in a curable composition, and the rheology control agent contains: a diamide compound (A) and/or a hydrogenated castor oil (A'); and a polyamide compound (B). The details of the diamide compound (A), the hydrogenated castor oil (A') and the polyamide compound (B) will be described below.

(Diamide Compound (A))

The diamide compound (A) according to the present invention is a fatty acid diamide obtainable by condensation reaction between a diamine component (A1) and a monocarboxylic acid component (A2).

Raw materials for obtaining the diamide compound (A) according to the present invention include a diamine component (A1) selected from the group consisting of diamines with 2 to 12 carbon atoms, and a monocarboxylic acid component (A2) selected from the group consisting of hydrogenated castor oil fatty acids and linear saturated fatty acids. Examples of the diamine component (A1) and the monocarboxylic acid component (A2) include compounds exemplified below. The conditions of the condensation reaction (reaction temperature, formulation ratio of the components, and the like) may be set as appropriate by a known method.

<Diamine Component (A1)>

Examples of the diamine component (A1) according to the present invention include:

aliphatic diamines such as ethylenediamine (EDA), propylene diamine, tetramethylenediamine (TMDA), hexamethylenediamine (HMDA), octamethylenediamine (OMDA) and dodecamethylenediamine (DMDA); aromatic diamines such as ortho-xylene diamine, meta-xylenediamine (MXDA), para-xylene diamine (PXDA), diaminodiphenylmethane, diaminodiphenyl ether, diaminodiphenyl sulfone and methylenebischloroaniline; and cycloaliphatic diamines such as piperazine and isophorone diamine.

Among the above-mentioned diamines, it is preferred to use diamines having 2 to 8 carbon atoms (e.g., EDA, HMDA, MXDA, and the like) as the diamine component (A1) for enhancing the effect of sufficient activation of the rheology control agent under low-temperature conditions (hereinafter, simply referred to as "low-temperature activation").

<Monocarboxylic Acid Component (A2)>

Examples of the monocarboxylic acid component (A2) according to the present invention include saturated aliphatic monocarboxylic acids such as acetic acid, propionic acid, butyric acid, valeric acid, caproic acid, enanthic acid, caprylic acid, pelargonic acid, capric acid, lauric acid, myristic acid, palmitic acid, stearic acid, hydrogenated castor oil fatty acid (fatty acid containing a hydroxyl group, such as 12-hydroxystearic acid (hereinafter, referred to as "12-HSA") obtained by saponifying hydrogenated castor oil), arachidic acid and behenic acid; and unsaturated aliphatic monocarboxylic acid such as oleic acid, linoleic acid, ricinoleic acid, linolenic acid, eicosenoic acid, erucic acid and mixed fatty acids obtained from natural fats and oils (tall oil fatty acid, rice bran fatty acid, soybean oil fatty acid, tallowate, etc.).

Among the above-mentioned monocarboxylic acids, it is preferred to contain at least a hydrogenated castor oil fatty acid such as 12-HSA as the monocarboxylic acid component (A2) for enhancing the low-temperature activation effect of the rheology control agent of the present invention.

(Hydrogenated Castor Oil (A'))

The hydrogenated castor oil (A') is a triglyceride of a saturated fatty acid obtained by hydrogenating castor oil. The hydrogenated castor oil (A') may be a commercially available product, and examples thereof include C-wax (manufactured by Kokura Synthetic Industries, Ltd.), Kao wax 85P (manufactured by Kao Corporation), hydrogenated castor oil A (manufactured by Itoh Oil Chemicals Co., Ltd.) and hydrogenated castor oil (Yamakei Industries Co., Ltd.).

As the components of the rheology control agent according to the present invention, the following three combinations are possible: (1) the diamide compound (A) and the polyamide compound (B); (2) the hydrogenated castor oil (A') and the polyamide compound (B); and (3) the diamide compound (A), the hydrogenated castor oil (A') and the polyamide compound (B).

In order to enhance the low-temperature activation effect of the rheology control agent according to the present invention, the rheology control agent preferably contains at least the hydrogenated castor oil (A'). In particular, for enhancement of the low-temperature activation effect, the content of the hydrogenated castor oil (A') is preferably 10 mass % or more, and more preferably 25 mass % or more, when the total amount of the diamide compound (A) and the hydrogenated castor oil (A') is 100 mass %.

(Polyamide Compound (B))

The polyamide compound (B) according to the present invention is a polyamide obtainable by polycondensation of an amine component (B1) and a carboxylic acid component (B2). The amine component (B1) according to the present invention contains at least one amine selected from the group consisting of diamines with 2 to 54 carbon atoms and triamines with 2 to 54 carbon atoms as an essential component. Further, the carboxylic acid component (B2) contains at least one carboxylic acid selected from the group consisting of dicarboxylic acids with 4 to 54 carbon atoms and tricarboxylic acids with 4 to 54 carbon atoms as an essential component. The polyamide compound (B) is a polyamide obtained by polycondensation of at least one of an amine component (B1) containing polymerized fatty acid derivatives and a carboxylic acid component (B2) containing polymerized fatty acids. That is, as an essential component of the raw material of the polyamide compound (B) according to the present invention, at least one of amines as polymerized fatty acid derivatives and polymerized fatty acids is contained. For synthesis of the polyamide compound (B), the following combinations of the amine component (B1) and the carboxylic acid component (B2) are possible: amines as polymerized fatty acid derivatives and polymerized fatty acids; a diamine or triamine other than polymerized fatty acid derivatives and polymerized fatty acids; and amines as polymerized fatty acid derivatives and a dicarboxylic acid or a tricarboxylic acid other than polymerized fatty acids.

The polyamide compound (B) may be a polyamide having any chemical structure as long as it is a polymer compound obtained by polycondensation of the above amine component (B1) and the carboxylic acid component (B2), and having an amide bond (—CONH—). In the following description, the amine component (B1) and the carboxylic acid component (B2) used for synthesis of the polyamide compound (B), physical properties of the polyamide compound (B), and a method of synthesizing the polyamide compound (B) will be described in this order.

<Amine Component (B1)>

As the amine component (B1), at least one amine selected from the group consisting of diamines with 2 to 54 carbon atoms and triamines with 2 to 54 carbon atoms can be used. Examples of the above diamines include: aliphatic diamines such as ethylenediamine (EDA), propylene diamine, tetramethylenediamine (TMDA), hexamethylenediamine (HMDA), octamethylenediamine (OMDA) and dodecamethylenediamine (DMDA); aromatic diamines such as ortho-xylene diamine, meta-xylenediamine (MXDA), para-xylene diamine (PXDA), diaminodiphenylmethane, diaminodiphenyl ether, diaminodiphenyl sulfone and methylenebischloroaniline; and cycloaliphatic diamines such as piperazine and isophorone diamine. Further, examples of the above triamines include aliphatic triamines such as diethylenetriamine.

As the amine component (B1) according to the present invention, diamines or triamines derived from polymerized fatty acids, which are polymerized fatty acid derivatives, can also be used. Examples of such polymerized fatty acid derivatives include dimer diamines (DDA), which are dimer acid derivatives, and trimer triamines (TTA), which are trimer acid derivatives. Dimer acids are polymerized fatty acids obtained by polymerizing (dimerizing) unsaturated fatty acids (for example, unsaturated fatty acids having 18 carbon atoms) obtained from vegetable oil such as soybean oil, tall oil, linseed oil, cottonseed oil, or the like. Typically, dimer acids having 36 carbon atoms are commercially available. Although commercially available dimer acids contain monomer acids and trimer acids in addition to dimer acids, those having high dimer acid content are preferred. Dimer diamines are dimer acid derivatives in which two terminal carboxyl groups of the dimer acid are substituted with primary aminomethyl groups or amino groups, and those commercially available can be used. Further, trimer acids are polymerized fatty acids obtained based on dimer acids by increasing the trimer acid content by distillation purification or the like. Typically, trimer acids having 54 carbon atoms are commercially available. Although commercially available trimer acids contain monomer acids and dimer acids in addition to trimer acids, those having high trimer acid content are preferred. Trimer triamines are trimer acid derivatives in which three terminal carboxyl groups of the trimer acid are substituted with primary aminomethyl groups or amino groups, and those commercially available can be used.

Further, as the amine component (B1), monoamines may also be used in combination with the above diamines and/or triamines within a range that does not hinder the low-temperature activation effect of the rheology control agent according to the present invention. Examples of the monoamines that can be used for the amine component (B1) include ethylamine, monoethanolamine, propyl amine, butyl amine, pentyl amine, hexyl amine, octyl amine, decyl amine, lauryl amine, myristyl amine, cetyl amine, stearyl amine and behenyl amine.

The compounds used as the above amine component (B1) can be used singly or as a mixture of two or more.

<Carboxylic Acid Component (B2)>

As the carboxylic acid component (B2), at least one carboxylic acid selected from the group consisting of dicarboxylic acids with 4 to 54 carbon atoms and tricarboxylic acids with 4 to 54 carbon atoms can be used. Examples of the dicarboxylic acids include succinic acid, glutaric acid, adipic acid, pimelic acid, suberic acid, azelaic acid, sebacic acid, dodecanedioic acid, maleic acid, fumaric acid, phthalic acid, isophthalic acid, terephthalic acid and dimer acids. Dimer acids are polymerized fatty acids obtained by polymerizing (dimerizing) unsaturated fatty acids (for example, unsaturated fatty acid having 18 or 22 carbon atoms) obtained from vegetable oil such as soybean oil, tall oil, linseed oil, cottonseed oil, or the like. Typically, dimer acids having 36 or 44 carbon atoms are commercially available. Although commercially available dimer acids contain monomer acids and trimer acids in addition to dimer acids, those having high dimer acid content are preferred.

Further, the examples of the above tricarboxylic acids include trimer acids and trimesic acids. Trimer acids are polymerized fatty acids obtained based on dimer acids by increasing the trimer acid content by distillation purification or the like. Typically, trimer acids having 54 carbon atoms are commercially available. Although commercially available trimer acids contain monomer acids and dimer acids in addition to trimer acids, those having high trimer acid content are preferred.

Further, as the carboxylic acid component (B2), monocarboxylic acids may also be used in combination with the above dicarboxylic acids and/or tricarboxylic acids within a range that does not hinder the low-temperature activation effect of the rheology control agent according to the present invention. Examples of the monocarboxylic acids that can be used for the carboxylic acid component (B2) include: saturated aliphatic monocarboxylic acids such as acetic acid, propionic acid, butyric acid, valeric acid, caproic acid, enanthic acid, caprylic acid, pelargonic acid, capric acid, lauric acid, myristic acid, palmitic acid, stearic acid, hydrogenated castor oil fatty acid, arachidic acid and behenic acid; and unsaturated aliphatic monocarboxylic acid such as oleic acid, linoleic acid, ricinoleic acid, linolenic acid, eicosenoic acid, erucic acid and mixed fatty acids obtained from natural fats and oils (tall oil fatty acid, rice bran fatty acid, soybean oil fatty acid, tallowate, etc.).

When a monocarboxylic acid is contained as the carboxylic acid component (B2), it is preferred to contain a monocarboxylic acid having 2 to 22 carbon atoms for further improving low-temperature activation effect. Among these, it is particularly preferred to contain a hydrogenated castor oil fatty acid such as 12-HSA.

The compounds used as the above carboxylic acid component (B2) can be used singly or as a mixture of two or more.

In order to enhance the low-temperature activation effect of the curable composition containing the rheology control agent according to the present invention, the carboxylic acid component (B2) preferably contains at least polymerized fatty acids. The polymerized fatty acids used as the carboxylic acid component (B2) of the present invention are polymers obtained by polymerizing a monobasic fatty acid having an unsaturated bond or a polymer obtained by polymerizing an ester of a monobasic fatty acid having an unsaturated bond. The monobasic fatty acid having an unsaturated bond may be typically an unsaturated fatty acid having 1 to 3 unsaturated bonds and having 8 to 24 total carbon atoms. Examples of the unsaturated fatty acid include oleic acid, linoleic acid, linolenic acid, natural drying oil fatty acids and natural semi-drying oil fatty acids. The ester of a monobasic fatty acid having an unsaturated bond may be an ester of the monobasic fatty acid having an unsaturated bond and an aliphatic alcohol, preferably an aliphatic alcohol having 1 to 3 carbon atoms. Among these polymerized fatty acids, dimer acids and trimer acids are particularly preferred as the carboxylic acid component (B2).

When the carboxylic acid component (B2) contains at least the above polymerized fatty acids, the amine component (B1) is not specifically limited, and may be polymerized fatty acid derivatives (for example, dimer diamine or trimer triamine) or may be a diamine or a triamine other than polymerized fatty acid derivatives. However, in order to enhance the low-temperature activation effect of the rheology control agent according to the present invention, it is preferred that the amine component (B1) is a diamine or a triamine having 2 to 12 carbon atoms when the carboxylic acid component (B2) contains at least the polymerized fatty acids. As a particularly preferred combination, the amine component (B1) contains at least one diamine selected from the group consisting of ethylenediamine, tetramethylenediamine, hexamethylenediamine, octamethylenediamine, meta-xylenediamine and dodecamethylenediamine, and the carboxylic acid component (B2) contains polymerized fatty acids of at least one of a dimer acid and a trimer acid.

<Physical Properties of Polyamide Compound (B)>

The polyamide compound (B) according to the present invention has a weight-average molecular weight Mw of 2,000 or more and 21,000 or less. When the weight-average molecular weight Mw of the polyamide compound (B) is outside the above range, the low-temperature activation effect of the rheology control agent according to the present invention cannot be performed. In the composition in which the rheology control agent is composed of the diamide compound (A) and the polyamide compound (B) (and contains substantially no hydrogenated castor oil (A')), the weight-average molecular weight Mw of the polyamide compound (B) is more preferably 3,000 or more and 13,000 or less in order to further enhance the low-temperature activation effect of the rheology control agent. Furthermore, in the composition in which the rheology control agent contains the hydrogenated castor oil (A') (composition composed of the diamide compound (A), the hydrogenated castor oil (A') and the polyamide compound (B), or composition composed of the hydrogenated castor oil (A') and the polyamide compound (B)), the weight-average molecular weight Mw of the polyamide compound (B) is more preferably 3,000 or more and 13,000 or less, and still more preferably 3,500 or more and 6,500 or less in order to further enhance the low-temperature activation effect of the rheology control agent.

The low-temperature activation effect tends to be higher when the hydrogenated castor oil (A') is contained as a component of the rheology control agent than when no hydrogenated castor oil (A') is contained. The present inventors consider the reason for this is that the hydrogenated castor oil (A') activated by the polyamide compound (B) promotes activation of the diamide compound (A).

The weight-average molecular weight Mw described herein is a value calculated based on a molecular weight of standard polystyrene in a chromatogram measured by gel permeation chromatography (GPC).

<Method of Synthesizing Polyamide Compound (B)>

The polyamide compound (B) according to the present invention can be synthesized by polycondensation reaction between the above-mentioned amine component (B1) and the carboxylic acid component (B2) under known reaction conditions. For example, the amine component (B1) and the carboxylic acid component (B2) as raw materials are introduced into a reaction vessel such as a four-neck flask, and the raw materials are stirred in an inert gas atmosphere (for example, under a nitrogen gas stream or the like) to prepare a mixture. Then, the mixture of the raw materials is heated and subjected to a polycondensation reaction at 150° C. to 200° C. for 2 to 10 hours to synthesize the polyamide compound (B).

In this process, a reaction molar ratio (B1/B2) between the amine component (B1) and the carboxylic acid component (B2) is preferably less than 1. That is, it is preferred that an excess amount (molar ratio) of the carboxylic acid component (B2) to the amine component (B1) is subjected to a polycondensation reaction. In this case, at least one terminal of the polyamide compound (B) is a carboxyl group. However, in order to obtain the low-temperature activation effect required in the present invention, it is not necessarily required that at least one terminal of the polyamide compound (B) is a carboxyl group, but all the terminals may be amino groups. Further, the reaction molar ratio (B1/B2) refers to the ratio (molar ratio) of the amount of the amine component (B1) to the amount of the carboxylic acid component (B2).

(Method of Producing Rheology Control Agent)

The above rheology control agent can be produced by mixing the diamide compound (A) and/or the hydrogenated castor oil (A') with the polyamide compound (B) as follows. For example, after the diamide compound (A) and/or the hydrogenated castor oil (A') are heated and melted, the polyamide compound (B) is added thereto, and melted and mixed. In this process, the melting temperature may be higher than or equal to the melting points of the diamide compound (A), the hydrogenated castor oil (A') and the polyamide compound (B). Then, a melt in which the diamide compound (A) and/or the hydrogenated castor oil (A') is melted and mixed with the polyamide compound (B) is taken out as a solid. The solid of a mixture, in which the diamide compound (A) and/or the hydrogenated castor oil (A') is mixed with the polyamide compound (B), is pulverized into a desired particle size. Thus, a powdery rheology control agent containing the polyamide compound (B) and at least one of the diamide compound (A) and the hydrogenated castor oil (A') is produced. The method of pulverizing the solid, in which the diamide compound (A) and/or the hydrogenated castor oil (A') is mixed with the polyamide compound (B), is not specifically limited, and for example, a jet mill can be used.

In production of the rheology control agent, the formulation amount of the polyamide compound (B) is preferably 1 mass % or more and 50 mass % or less of the total amount of the polyamide compound (B) and at least one of the diamide compound (A) and the hydrogenated castor oil (A'). In other words, the rheology control agent according to the present invention can be obtained by blending 1 mass % or more and 50 mass % or less of the polyamide compound (B) when the total amount of the polyamide compound (B) and at least one of the diamide compound (A) and the hydrogenated castor oil (A') is 100 mass %. When the formulation amount of the polyamide compound (B) is within the above range, the low-temperature activation effect of the rheology control agent according to the present invention is enhanced.

In the composition in which the rheology control agent is composed of the diamide compound (A) and the polyamide compound (B) (and contains substantially no hydrogenated castor oil (A')), the lower limit of the formulation amount of the polyamide compound (B) is more preferably 2.5 mass % or more, and still more preferably 5 mass % or more for further enhancing the low-temperature activation effect of the rheology control agent. On the other hand, the upper limit of the formulation amount of the polyamide compound (B) is more preferably 25 mass % or less, and still more preferably 10 mass % or less for further enhancing the low-temperature activation effect of the rheology control agent. Furthermore, in the composition in which the rheology control agent contains the hydrogenated castor oil (A') (composition composed of the diamide compound (A), the hydrogenated castor oil (A') and the polyamide compound (B), or composition composed of the hydrogenated castor oil (A') and the polyamide compound (B)), the lower limit of the formulation amount of the polyamide compound (B) is more preferably 2.5 mass % or more, and still more preferably 5 mass % or more for further enhancing the low-temperature activation effect of the rheology control agent. On the other hand, the upper limit of the formulation amount of the polyamide compound (B) is more preferably 30 mass % or less, still more preferably 15 mass % or less, and most preferably 10 mass % or less for further enhancing the low-temperature activation effect of the rheology control agent.

(Applications of Rheology Control Agent)

Suitable applications of the rheology control agent according to the present invention are additives for use in curable compositions used for sealants for buildings, ships, automobiles, roads, and the like, or adhesives such as elastic adhesives, contact adhesives, tile adhesives, interior panel adhesives, exterior panel adhesives, tile adhesives, stone adhesives, ceiling finishing adhesives, flooring finishing adhesives, wall finishing adhesives, vehicle panel adhesives, and assembling adhesives for electric, electronic and precision devices.

[Curable Composition]

The curable composition according to the present invention contains the rheology control agent described above and a binder as essential components. The curable composition according to the present invention may further contain a plasticizer, a filler, and other additives such as a water scavenger and an adhesion promoter as optional components. The content of the rheology control agent for use in the curable composition of the present invention varies depending on the type of resin as a binder in the curable composition, the formulation composition of a filler such as a pigment, or the like. Typically, the content is 0.1 parts by mass or more and 30 parts by mass or less, and preferably 1 part by mass or more and 20 parts by mass or less, when the total resin solid content in the curable composition is 100 parts by mass. When the content of the rheology control agent is within the above range, the rheology control agent can be sufficiently activated in production of the curable composition under low-temperature conditions.

(Binder)

Examples of the resin contained as a binder in the curable composition include modified silicone resins. Modified silicone resins contain, as a main component, a silyl group-terminated polyether in which a reactive silyl group is introduced into the terminal. For example, when a modified silicone resin is used as a binder of a curable composition such as a sealant, the modified silicone resin preferably cures in the presence of water and forms a siloxane bond. Examples of the modified silicone resin include a silyl modified polymer, which is formed by introducing a silyl group into a hydroxyl group terminal of a linear or branched polyoxyalkylene polymer which is a main chain. Other examples of the silyl modified polymer include silyl modified polyurethane, silyl modified polyester, silylated acrylate, and silyl group-terminated polyisobutylene. The modified silicone resin may be obtained by a known synthesis method, or may be a commercially available product. Examples of the commercially available product of the modified silicone resin include MS polymer S810, MS polymer S202, MS polymer S203 and MS polymer S303 manufactured by Kaneka Corporation, and Excestar manufactured by AGC Inc.

Examples of the resin contained as a binder of the curable composition include, in addition to the modified silicone resins described above, silicone resins, acrylic resins, acrylic urethane resins, alkyd resins, polyester resins, urethane resins, epoxy resins, polysulfide resins, amino resins, butyl rubbers, and commercially available oily caulking materials. These resins may be, for example, thermosetting type, UV-curable type, EB (Electron Beam)-curable type, oxidative curable type, photocationic curable type, peroxide curable type, or acid/epoxy curable type that cure with chemical reaction in the presence or absence of a catalyst, or may be resins having high glass transition point and forming a film only by volatilizing a diluting solvent without involving chemical reactions. Further, examples of the curing agent include amino resins, melamine resins, isocyanate compounds, block isocyanate compounds, and epoxy compounds.

(Plasticizer)

Examples of the plasticizer include dimethyl phthalate (DMP), diethyl phthalate (DEP), di-n-butyl phthalate (DBP), diheptyl phthalate (DHP), dioctyl phthalate (DOP), diisononyl phthalate (DINP), diisononyl 1,2-cyclohexanedicarboxylate (DINCH), diisodecyl phthalate (DIDP), ditridecyl phthalate (DTDP), butyl benzyl phthalate (BBP), dicyclohexyl phthalate (DCHP), tetrahydrophthalic ester, dioctyl adipate (DOA), diisononyl adipate (DINA), diisodecyl adipate (DIDA), di-n-alkyl adipate, dibutyl diglycol adipate (BXA), bis(2-ethylhexyl) azelate (DOZ), dibutyl sebacate (DBS), dioctyl sebacate (DOS), dibutyl maleate (DBM), di-2-ethylhexyl maleate (DOM), dibutyl fumarate (DBF), tricresyl phosphate (TCP), triethyl phosphate (TEP), tributyl phosphate (TBP), tris(2-ethylhexyl) phosphate (TOP), tris(chloroethyl) phosphate (TCEP), tris(dichloro-propyl) phosphate (CRP), tributoxyethyl phosphate (TBXP), tris(β-chloropropyl) phosphate (TMCPP), triphenyl phosphate (TPP), octyl diphenyl phosphate (CDP), acetyl triethyl citrate, tributyl acetyl citrate, trimellitic acid-based plasticizer, polyester-based plasticizer, polyether-based plasticizer, epoxy-based plasticizer, chlorinated paraffin, stearic acid-based plasticizer, dimethyl polysiloxane, and process oil.

(Filler)

Examples of the filler include extender pigments such as calcium carbonate (ground calcium carbonate (GCC)), precipitated calcium carbonate (PCC), and the like, barium sulfate, silicon dioxide, aluminum hydroxide, talc, organic fibers, and glass powder; coloring pigments such as titanium dioxide, carbon black, chrome yellow, cadmium yellow, ocher, titanium yellow, zinc chromate, iron oxide red, aluminosilicate, quinacridone pigments, phthalocyanine pigments, anthraquinone pigments, diketopyrrolopyrrole pigments, benzimidazolone pigments, and isoindolinone pigments; and metallic pigments such as aluminum flakes, copper flakes, micaceous iron oxide, mica, and scaly powder of mica coated with metal oxide.

(Other Additives)

The curable composition of the present invention may contain other substances within a range that does not impair the characteristics thereof and purposes of the present invention. Examples of such substances include water scavengers (for example, silane coupling agents), adhesion promoters, surfactants, curing catalysts, film-thickening aids, dryers, anti-fouling agents, sensitizers, antioxidants, photostabilizers, UV absorbers, water resistant agents, antiseptic and antifungal agents, defoamers, leveling agents, dispersants, flame retardants, antistatic agents, release agents, deodorants and fragrances.

(Method of Producing Curable Composition)

The curable composition of the present invention can be produced by using known methods of producing sealants or adhesives. For example, the curable composition of the present invention is produced by mixing the components of the binder, plasticizer, filler, rheology control agent, or the like described above with a three-roll mill, a dissolver, or the like, and then kneading the mixture while being heated under reduced pressure. The heating temperature during kneading may be, for example, 25 to 50° C.

(Applications of Curable Composition)

Cured products of the curable composition of the present invention can be used for sealants for buildings, ships, automobiles, roads, medical devices, and the like, or adhesives such as elastic adhesives, contact adhesives, tile adhesives, interior panel adhesives, exterior panel adhesives, tile adhesives, stone adhesives, ceiling finishing adhesives, flooring finishing adhesives, wall finishing adhesives, vehicle panel adhesives, and assembling adhesives for electric, electronic and precision devices.

[Mechanism of Activation Under Low-Temperature Conditions]

With reference to FIG. 1, a mechanism of enhancing the activation effect of the rheology control agent under low-temperature conditions in the curable composition described above assumed by the present inventors will be described. FIG. 1 is a schematic diagram illustrating a mechanism by which a polyamide compound (B) disperses aggregates of a diamide compound (A) and/or a hydrogenated castor oil (A') to promote activation of the diamide compound (A) and/or the hydrogenated castor oil (A').

When sealants, adhesives, or the like are produced at low kneading temperatures (low-temperature conditions), the amount of heat required for activation of the rheology control agent becomes insufficient, making it difficult to sufficiently activate the rheology control agent. Therefore, as shown in FIG. 1, in which a mixture of the diamide compound (A) and the polyamide compound (B) is used as the rheology control agent, aggregates Dc of the powder (solid particles) Dd of the diamide compound (A) are dispersed by the molecules P of the polyamide compound (B). The diamide compound (A) in the state of the aggregates Dc is not likely to assume an acicular shape (that is, not likely to be activated), but when the aggregates Dc of the diamide compound (A) are dispersed into solid particles Dd by the molecules P of the polyamide compound (B), the diamide compound (A) is likely to assume an acicular shape Da. Thus, due to the molecules P of the polyamide compound (B) being present in the curable composition, the aggregates Dc of the diamide compound (A) are dispersed, promoting activation of the diamide compound (A).

As a result, activation of the rheology control agent contained in the curable composition of the present invention proceeds even under low-temperature conditions such as in production of sealants, adhesives, or the like. Further, the activated diamide compound (A) imparts stable viscosity to the system of the curable composition, and the stable structure (shown in the right view in FIG. 1) is maintained and stabilized by the action of the polyamide compound (B).

By the mechanism shown in FIG. 1, the molecules P of the polyamide compound (B) act to disperse the aggregates of the powder (solid particles) of the diamide compound (A) regardless of the type of the diamide compound (A). Further, when the hydrogenated castor oil (A') is used instead of or in addition to the diamide compound (A), the molecules P of the polyamide compound (B) also act to disperse the aggregates of the powder (solid particles) of the hydrogenated castor oil (A') by the mechanism shown in FIG. 1.

Some preferred embodiments of the present invention have been described above, but the present invention is not limited to the aforementioned embodiments. That is, other embodiments or various modifications that would occur to those skilled in the art within the scope of the appended claims should be construed as being within the technical scope of the present invention.

EXAMPLES

The present invention will be specifically described below by using examples. Further, the present invention is not limited to these examples in any way. In the examples, "%" and "parts" indicate "mass %" and "parts by mass," respectively, unless otherwise specified.

[Synthesis of Diamide Compound (A)]

The diamine component (A1) and the monocarboxylic acid component (A2) described in Table 1 were reacted at 190° C. for 6 hours under a nitrogen gas stream while removing the generated water to thereby obtain diamide compounds (A) of Synthesis Examples A-1 to A-8.

TABLE 1

| | Formulation composition of diamide compound (A) | | | | | | | |
| | Diamine component (A1)/mol | | | | | Monocarboxylic acid component (A2)/mol | | |
| | | | | | | Propionic | Capric | Stearic |
| No. | EDA C2 | HMDA C6 | MXDA C8 | DMDA C12 | 12-HSA C18 | acid C3 | acid C10 | acid C18 |
|---|---|---|---|---|---|---|---|---|
| Synthesis example A-1 | | 1.0 | | | 2.0 | | | |
| Synthesis example A-2 | 1.0 | | | | 1.0 | 1.0 | | |
| Synthesis example A-3 | | | 1.0 | | 2.0 | | | |
| Synthesis example A-4 | | 1.0 | | | | | 2.0 | |
| Synthesis example A-5 | | 1.0 | | | 1.0 | | | 1.0 |
| Synthesis example A-6 | | 1.0 | 1.0 | | 4.0 | | | |
| Synthesis example A-7 | 1.0 | | | | 1.2 | | 0.8 | |
| Synthesis example A-8 | | | | 1.0 | 2.0 | | | |

[Synthesis of Polyamide Compound (B)]

First, the amine component (B1) and the carboxylic acid component (B2) described in Table 2 as raw materials were introduced into a four-neck flask at molar ratios described in Table 2. The mixture was heated while being stirred under a nitrogen gas stream, and reacted at 150° C. for 1 hour, and poration) as a measurement device for GPC, and one "GPCKF-801" and two "GPCKF-802" (trade name, both manufactured by Shodex Co., Ltd) as three columns under the conditions of a mobile phase; tetrahydrofuran, a measurement temperature of 40° C., a flow rate of 1 cc/min., and a detector; RI (Refractive Index).

TABLE 2

| | Formulation composition and molecular weight of polyamide compound (B) | | | | | | | | | |
| | Amine component (B1)/mol | | | | | | Carboxylic acid component (B2)/mol | | | |
| | | | | | | | Adipic | Dimer | Trimer | |
| No. | EDA C2 | HMDA C6 | OMDA C8 | MXDA C8 | DMDA C12 | DDA C36 | acid C6 | acid C36 | acid C54 | MW |
|---|---|---|---|---|---|---|---|---|---|---|
| Synthesis example B-1 | | 2.0 | | | | | | 3.0 | | 6,280 |
| Synthesis example B-2 | 2.0 | | | | | | | 3.0 | | 6,990 |
| Synthesis example B-3 | | | 2.0 | | | | | 3.0 | | 7,035 |
| Synthesis example B-4 | | | | | 2.0 | | | 3.0 | | 7,772 |
| Synthesis example B-5 | | | | | | 2.0 | | 3.0 | | 6,975 |
| Synthesis example B-6 | | 1.0 | | | | | | 2.0 | | 3,728 |
| Synthesis example B-7 | | 3.0 | | | | | | 4.0 | | 12,912 |
| Synthesis example B-8 | | 5.0 | | | | | | 6.0 | | 16,862 |
| Synthesis example B-9 | | 6.0 | | | | | | 7.0 | | 20,381 |
| Synthesis example B-10 | | | | 2.0 | | | | 3.0 | | 6,651 |
| Synthesis example B-11 | | 1.0 | | | | | | | 2.0 | 4,728 |
| Synthesis example B-12 | | 3.0 | | | | | | 2.0 | | 8,031 |
| Synthesis example B-13 | | | | | | 4.0 | 5.0 | | | 5,132 |
| Comparative synthesis example B-1 | | 7.0 | | | | | | 8.0 | | 21,330 | then further reacted at 175° C. for 2 hours. Thus, the polyamide compounds (B) of Synthesis Examples B-1 to B-13 and Comparative Synthesis Example B-1 described in Table 2 were obtained. The polyamide compound of Comparative Synthesis Example B-1 (hereinafter, referred to as a "polyamide compound (B')") is a synthesis example that does not correspond to the polyamide compound (B) of the present invention. Further, the "12-HSA" in Table 2 refers to a hydrogenated castor oil fatty acid (12-hydroxystearic acid).

The weight-average molecular weight Mw of Synthesis Examples B-1 to B-13 and Comparative Synthesis Example B-1 obtained as described above were measured. Specifically, a value calculated based on the molecular weight of standard polystyrene in a chromatogram measured by GPC was used as the weight-average molecular weight Mw. The weight-average molecular weight was measured by using "HLC-8320GPC" (trade name, manufactured by Tosoh Cor-

[Production of Rheology Control Agent]

Next, a method of producing a rheology control agent will be described.

Preparation Examples 1 to 24

The polyamide compounds (B) of Synthesis Examples B-1 to B-13 were respectively added to the diamide compounds (A) of Synthesis Examples A-1 to A-5 and A-8 obtained as described above at the formulation composition shown in Table 3, and melted and mixed. Further, these melting mixtures were taken out as a solid, and the solid mixtures were pulverized using a mill into particles with a median diameter in the range of 1 μm to 10 μm. Thus, the rheology control agents of Preparation Examples 1 to 24 were obtained.

Preparation Examples 25 to 47

After the diamide compounds (A) of Synthesis Examples A-1 and A-5 to A-7 were obtained as described above, C-wax (manufactured by Kokura Synthetic Industries, Ltd.) as the hydrogenated castor oil (A') was each added at the formulation composition shown in Table 3, and melted and mixed. Further, the polyamide compounds (B) of Synthesis Examples B-1 to B-9 and B-11 to B-13 were respectively added to these melting mixtures at the formulation composition shown in Table 3, and melted and mixed. Then, these melting mixtures were taken out as a solid, and the solid mixtures were pulverized using a mill into particles with a median diameter in the range of 1 μm to 10 μm. Thus, the rheology control agents of Preparation Examples 25 to 47 were obtained.

Preparation Example 48

In an example using C-wax (manufactured by Kokura Synthetic Industries, Ltd.) as the hydrogenated castor oil (A'), the polyamide compound (B) of Synthesis Example B-1 was added to the heated melt of the hydrogenated castor oil (A'), and melted and mixed. Further, the melting mixture was taken out as a solid, and the solid mixture was pulverized using a mill into particles with a median diameter in the range of 1 μm to 10 μm. Thus, the rheology control agent of Preparation Example 48 was obtained.

Preparation Examples 49 to 56

After the diamide compound (A) of Synthesis Example A-1 was obtained as described above, C-wax (manufactured by Kokura Synthetic Industries, Ltd.) as the hydrogenated castor oil (A') was each added at the formulation composition shown in Table 3, and melted and mixed. Further, the polyamide compound (B) of Synthesis Example B-1 was each added to these melting mixtures at the formulation composition shown in Table 3, and melted and mixed. Then, these melting mixtures were taken out as a solid, and the solid mixtures were pulverized using a mill into particles with a median diameter in the range of 1 μm to 10 μm. Thus, the rheology control agents of Preparation Examples 49 to 56 were obtained.

Comparative Preparation Example 1

The rheology control agent of Comparative Preparation Example 1 was prepared in the same manner as Preparation Example 1 except that the formulation amount of the diamide compound (A) of Synthesis Example A-1 was 99.0 mass % and the formulation amount of the polyamide compound (B) of Synthesis Example B-1 was 1.0 mass %.

Comparative Preparation Example 2

The rheology control agent of Comparative Preparation Example 2 was prepared in the same manner as Preparation Example 1 except that the formulation amount of the diamide compound (A) of Synthesis Example A-1 was 70.0 mass % and the formulation amount of the polyamide compound (B) of Synthesis Example B-1 was 30.0 mass %.

Comparative Preparation Example 3

The rheology control agent of Comparative Preparation Example 3 was prepared in the same manner as Preparation Example 1 except that the polyamide compound (B') of Comparative Synthesis Example B-1 was used instead of the polyamide compound (B) of Synthesis Example B-1.

Comparative Preparation Example 4

The rheology control agent of Comparative Preparation Example 4 was prepared in the same manner as Preparation Example 25 except that the polyamide compound (B') of Comparative Synthesis Example B-1 was used instead of the polyamide compound (B) of Synthesis Example B-1.

Tables 3 and 4 show the component and formulation amount of the rheology control agents of Preparation Examples 1 to 56 and Comparative Preparation Examples 1 to 4.

TABLE 3

| | | | | | | |
|---|---|---|---|---|---|---|
| Formulation composition of rheology control agent (Part 1) | | | | | | |
| | Diamide compound (A) | | Hydrogenated castor oil (A') | | Polyamide compound (B) | |
| No. | Synthesis example | Formulation amount/ mass % | Trade name | Formulation amount/ mass % | Synthesis example | Formulation amount/ mass % |
| Preparation example 1 | Synthesis example A-1 | 90.00 | — | — | Synthesis example B-1 | 10.00 |
| Preparation example 2 | Synthesis example A-1 | 97.50 | — | — | Synthesis example B-1 | 2.50 |
| Preparation example 3 | Synthesis example A-1 | 95.00 | — | — | Synthesis example B-1 | 5.00 |
| Preparation example 4 | Synthesis example A-1 | 92.50 | — | — | Synthesis example B-1 | 7.50 |
| Preparation example 5 | Synthesis example A-1 | 85.00 | — | — | Synthesis example B-1 | 15.00 |
| Preparation example 6 | Synthesis example A-1 | 80.00 | — | — | Synthesis example B-1 | 20.00 |
| Preparation example 7 | Synthesis example A-1 | 75.00 | — | — | Synthesis example B-1 | 25.00 |
| Preparation example 8 | Synthesis example A-1 | 90.00 | — | — | Synthesis example B-2 | 10.00 |
| Preparation example 9 | Synthesis example A-1 | 90.00 | — | — | Synthesis example B-3 | 10.00 |
| Preparation example 10 | Synthesis example A-1 | 90.00 | — | — | Synthesis example B-4 | 10.00 |
| Preparation example 11 | Synthesis example A-1 | 90.00 | — | — | Synthesis example B-5 | 10.00 |
| Preparation example 12 | Synthesis example A-1 | 90.00 | — | — | Synthesis example B-10 | 10.00 |
| Preparation example 13 | Synthesis example A-1 | 90.00 | — | — | Synthesis example B-6 | 10.00 |
| Preparation example 14 | Synthesis example A-1 | 90.00 | — | — | Synthesis example B-7 | 10.00 |
| Preparation example 15 | Synthesis example A-1 | 90.00 | — | — | Synthesis example B-8 | 10.00 |
| Preparation example 16 | Synthesis example A-1 | 90.00 | — | — | Synthesis example B-9 | 10.00 |
| Preparation example 17 | Synthesis example A-1 | 90.00 | — | — | Synthesis example B-11 | 10.00 |
| Preparation example 18 | Synthesis example A-1 | 90.00 | — | — | Synthesis example B-12 | 10.00 |
| Preparation example 19 | Synthesis example A-1 | 90.00 | — | — | Synthesis example B-13 | 10.00 |
| Preparation example 20 | Synthesis example A-2 | 90.00 | — | — | Synthesis example B-1 | 10.00 |
| Preparation example 21 | Synthesis example A-3 | 90.00 | — | — | Synthesis example B-10 | 10.00 |
| Preparation example 22 | Synthesis example A-4 | 90.00 | — | — | Synthesis example B-1 | 10.00 |

TABLE 3-continued

| | Formulation composition of rheology control agent (Part 1) | | | | | |
|---|---|---|---|---|---|---|
| | Diamide compound (A) | | Hydrogenated castor oil (A') | | Polyamide compound (B) | |
| No. | Synthesis example | Formulation amount/ mass % | Trade name | Formulation amount/ mass % | Synthesis example | Formulation amount/ mass % |
| Preparation example 23 | Synthesis example A-5 | 90.00 | — | — | Synthesis example B-1 | 10.00 |
| Preparation example 24 | Synthesis example A-8 | 90.00 | — | — | Synthesis example B-1 | 10.00 |

TABLE 4

| | Formulation composition of rheology control agent (Part 2-1) | | | | | |
|---|---|---|---|---|---|---|
| | Diamide compound (A) | | Hydrogenated castor oil (A') | | Polyamide compound (B) | |
| No. | Synthesis example | Formulation amount/ mass % | Trade name | Formulation amount/ mass % | Synthesis example | Formulation amount/ mass % |
| Preparation example 25 | Synthesis example A-1 | 45.00 | C-wax | 45.00 | Synthesis example B-1 | 10.00 |
| Preparation example 26 | Synthesis example A-1 | 49.50 | C-wax | 49.50 | Synthesis example B-1 | 1.00 |
| Preparation example 27 | Synthesis example A-1 | 48.75 | C-wax | 48.75 | Synthesis example B-1 | 2.50 |
| Preparation example 28 | Synthesis example A-1 | 47.50 | C-wax | 47.50 | Synthesis example B-1 | 5.00 |
| Preparation example 29 | Synthesis example A-1 | 46.25 | C-wax | 46.25 | Synthesis example B-1 | 7.50 |
| Preparation example 30 | Synthesis example A-1 | 42.50 | C-wax | 42.50 | Synthesis example B-1 | 15.00 |
| Preparation example 31 | Synthesis example A-1 | 40.00 | C-wax | 40.00 | Synthesis example B-1 | 20.00 |
| Preparation example 32 | Synthesis example A-1 | 37.50 | C-wax | 37.50 | Synthesis example B-1 | 25.00 |
| Preparation example 33 | Synthesis example A-1 | 35.00 | C-wax | 35.00 | Synthesis example B-1 | 30.00 |
| Preparation example 34 | Synthesis example A-1 | 45.00 | C-wax | 45.00 | Synthesis example B-2 | 10.00 |
| Preparation example 35 | Synthesis example A-1 | 45.00 | C-wax | 45.00 | Synthesis example B-3 | 10.00 |
| Preparation example 36 | Synthesis example A-1 | 45.00 | C-wax | 45.00 | Synthesis example B-4 | 10.00 |
| Preparation example 37 | Synthesis example A-1 | 45.00 | C-wax | 45.00 | Synthesis example B-5 | 10.00 |
| Preparation example 38 | Synthesis example A-1 | 45.00 | C-wax | 45.00 | Synthesis example B-6 | 10.00 |
| Preparation example 39 | Synthesis example A-1 | 45.00 | C-wax | 45.00 | Synthesis example B-7 | 10.00 |
| Preparation example 40 | Synthesis example A-1 | 45.00 | C-wax | 45.00 | Synthesis example B-8 | 10.00 |
| Preparation example 41 | Synthesis example A-1 | 45.00 | C-wax | 45.00 | Synthesis example B-9 | 10.00 |
| Preparation example 42 | Synthesis example A-1 | 45.00 | C-wax | 45.00 | Synthesis example B-11 | 10.00 |
| Preparation example 43 | Synthesis example A-1 | 45.00 | C-wax | 45.00 | Synthesis example B-12 | 10.00 |
| Preparation example 44 | Synthesis example A-1 | 45.00 | C-wax | 45.00 | Synthesis example B-13 | 10.00 |
| Preparation example 45 | Synthesis example A-5 | 63.00 | C-wax | 27.00 | Synthesis example B-1 | 10.00 |
| Preparation example 46 | Synthesis example A-6 | 63.00 | C-wax | 27.00 | Synthesis example B-1 | 10.00 |
| Preparation example 47 | Synthesis example A-7 | 63.00 | C-wax | 27.00 | Synthesis example B-1 | 10.00 |
| Preparation example 48 | — | — | C-wax | 90.00 | Synthesis example B-1 | 10.00 |

| | Formulation composition of rheology control agent (Part 2-2) | | | | | |
|---|---|---|---|---|---|---|
| | Diamide compound (A) | | Hydrogenated castor oil (A') | | Polyamide compound (B) | |
| No. | Synthesis example | Formulation amount/ mass % | Trade name | Formulation amount/ mass % | Synthesis example | Formulation amount/ mass % |
| Preparation example 49 | Synthesis example A-1 | 27.00 | C-wax | 63.00 | Synthesis example B-1 | 10.00 |
| Preparation example 50 | Synthesis example A-1 | 63.00 | C-wax | 27.00 | Synthesis example B-1 | 10.00 |
| Preparation example 51 | Synthesis example A-1 | 67.50 | C-wax | 22.50 | Synthesis example B-1 | 10.00 |
| Preparation example 52 | Synthesis example A-1 | 68.40 | C-wax | 21.60 | Synthesis example B-1 | 10.00 |
| Preparation example 53 | Synthesis example A-1 | 72.00 | C-wax | 18.00 | Synthesis example B-1 | 10.00 |
| Preparation example 54 | Synthesis example A-1 | 81.00 | C-wax | 9.00 | Synthesis example B-1 | 10.00 |
| Preparation example 55 | Synthesis example A-1 | 81.90 | C-wax | 8.10 | Synthesis example B-1 | 10.00 |
| Preparation example 56 | Synthesis example A-1 | 85.50 | C-wax | 4.50 | Synthesis example B-1 | 10.00 |
| Comparative preparation example 1 | Synthesis example A-1 | 99.00 | — | — | Synthesis example B-1 | 1.00 |
| Comparative preparation example 2 | Synthesis example A-1 | 70.00 | — | — | Synthesis example B-1 | 30.00 |
| Comparative preparation example 3 | Synthesis example A-1 | 90.00 | — | — | Comparative synthesis example B-1 | 10.00 |
| Comparative preparation example 4 | Synthesis example A-1 | 45.00 | C-wax | 45.00 | Comparative synthesis example B-1 | 10.00 |

[Production of Curable Composition]

Using the rheology control agents of Preparation Examples 1 to 56 and Comparative Preparation Examples 1 to 4 obtained as described above, the curable compositions of Examples 1 to 56 and Comparative Examples 1 to 4 were prepared with the formulations shown in Table 5.

Examples 1 to 56 and Comparative Examples 1 to 4

Specifically, 100 parts of MS polymer 5303H (modified silicone resin manufactured by Kaneka Corporation) as a binder (resin), 60 parts of SANSOCIZER DINP (diisononyl phthalate manufactured by New Japan Chemical Co., Ltd.) as a plasticizer, 200 parts of ImerSeal 36S (ground calcium carbonate manufactured by IMERYS S.A.), 10 parts of KRONOS 2190 (titanium dioxide manufactured by KRO- NOS Worldwide Inc.) and 60 parts of Hakuenka CCR (precipitated calcium carbonate manufactured by Shiraishi Kogyo Kaisha, Ltd.) as fillers, and 14 parts of the rheology control agent of any one of Preparation Examples 1 to 56 and Comparative Preparation Examples 1 to 4 as a rheology control agent were predispersed by a three-roll mill, and then the mixture was kneaded using a planetary mixer at 45° C. under reduced pressure. Then, 4 parts of Silquest A-171 (manufactured by Momentive Performance Materials Inc.) as a water scavenger, and 4 parts of Silquest A-1122 (manu- factured by Momentive Performance Materials Inc.) as an adhesion promoter were added to the kneaded product, and the mixture was kneaded using a planetary mixer. Thus, curable compositions of Examples 1 to 56 and Comparative Examples 1 to 4 were obtained. Each curable composition was filled in a sealable container. The curable compositions filled in the containers were used as samples for low-temperature activation evaluation. Tables 6 and 7 show the rheology control agents and the formulations used for Examples 1 to 56 and Comparative Examples 1 to 4.

TABLE 5

| Formulation composition of curable composition | |
| --- | --- |
| Component | Formulation amount (part) |
| MS polymer S303H | 100 |
| SANSOCIZER DINP | 60 |
| ImerSeal 36S | 200 |
| KRONOS 2190 | 10 |
| Hakuenka OCR | 60 |
| Rheology control agent | 14 |
| | 444 |
| Silquest A-171 | 4 |
| Silquest A-1122 | 4 |
| Total | 452 |

TABLE 6

Evaluation of curable composition (Part 1)

| | Rheology control agent | Diamide compound (A) and/or hydrogenated castor oil (A') | | Polyamide compound (B) or polyamide compound (B') | | | Low-temperature activation evaluation |
| --- | --- | --- | --- | --- | --- | --- | --- |
| | | Type | Formulation amount/ mass % | Type | Mw | Formulation amount/ mass % | |
| Example 1 | Preparation example 1 | Synthesis example A-1 | 90.00 | Synthesis example B-1 | 6,280 | 10.00 | B |
| Example 2 | Preparation example 2 | Synthesis example A-1 | 97.50 | Synthesis example B-1 | 6,280 | 2.50 | C |
| Example 3 | Preparation example 3 | Synthesis example A-1 | 95.00 | Synthesis example B-1 | 6,280 | 5.00 | B |
| Example 4 | Preparation example 4 | Synthesis example A-1 | 92.50 | Synthesis example B-1 | 6,280 | 7.50 | B |
| Example 5 | Preparation example 5 | Synthesis example A-1 | 85.00 | Synthesis example B-1 | 6,280 | 15.00 | C |
| Example 6 | Preparation example 6 | Synthesis example A-1 | 80.00 | Synthesis example B-1 | 6,280 | 20.00 | C |
| Example 7 | Preparation example 7 | Synthesis example A-1 | 75.00 | Synthesis example B-1 | 6,280 | 25.00 | C |
| Example 8 | Preparation example 8 | Synthesis example A-1 | 90.00 | Synthesis example B-2 | 6,990 | 10.00 | C |
| Example 9 | Preparation example 9 | Synthesis example A-1 | 90.00 | Synthesis example B-3 | 7,035 | 10.00 | C |
| Example 10 | Preparation example 10 | Synthesis example A-1 | 90.00 | Synthesis example B-4 | 7,772 | 10.00 | C |
| Example 11 | Preparation example 11 | Synthesis example A-1 | 90.00 | Synthesis example B-5 | 6,975 | 10.00 | B |
| Example 12 | Preparation example 12 | Synthesis example A-1 | 90.00 | Synthesis example B-10 | 6,651 | 10.00 | C |
| Example 13 | Preparation example 13 | Synthesis example A-1 | 90.00 | Synthesis example B-6 | 3,728 | 10.00 | B |
| Example 14 | Preparation example 14 | Synthesis example A-1 | 90.00 | Synthesis example B-7 | 12,912 | 10.00 | B |
| Example 15 | Preparation example 15 | Synthesis example A-1 | 90.00 | Synthesis example B-8 | 16,862 | 10.00 | C |
| Example 16 | Preparation example 16 | Synthesis example A-1 | 90.00 | Synthesis example B-9 | 20,381 | 10.00 | C |
| Example 17 | Preparation example 17 | Synthesis example A-1 | 90.00 | Synthesis example B-11 | 4,728 | 10.00 | B |
| Example 18 | Preparation example 18 | Synthesis example A-1 | 90.00 | Synthesis example B-12 | 8,031 | 10.00 | C |
| Example 19 | Preparation example 19 | Synthesis example A-1 | 90.00 | Synthesis example B-13 | 5,132 | 10.00 | C |
| Example 20 | Preparation example 20 | Synthesis example A-2 | 90.00 | Synthesis example B-1 | 6,280 | 10.00 | B+ |
| Example 21 | Preparation example 21 | Synthesis example A-3 | 90.00 | Synthesis example B-10 | 6,651 | 10.00 | B |
| Example 22 | Preparation example 22 | Synthesis example A-4 | 90.00 | Synthesis example B-1 | 6,280 | 10.00 | B+ |
| Example 23 | Preparation example 23 | Synthesis example A-5 | 90.00 | Synthesis example B-1 | 6,280 | 10.00 | B |
| Example 24 | Preparation example 24 | Synthesis example A-8 | 90.00 | Synthesis example B-1 | 6,280 | 10.00 | C |

TABLE 7

Evaluation of curable composition (Part 2-1)

| | Rheology control agent | Diamide compound (A) and/or hydrogenated castor oil (A') | | Polyamide compound (B) or polyamide compound (B') | | | Low-temperature activation evaluation |
|---|---|---|---|---|---|---|---|
| | | Type | Formulation amount/ mass % | Type | Mw | Formulation amount/ mass % | |
| Example 25 | Preparation example 25 | Synthesis example A-1 + C-wax | 90.00 | Synthesis example B-1 | 6,280 | 10.00 | A |
| Example 26 | Preparation example 26 | Synthesis example A-1 + C-wax | 99.00 | Synthesis example B-1 | 6,280 | 1.00 | C |
| Example 27 | Preparation example 27 | Synthesis example A-1 + C-wax | 97.50 | Synthesis example B-1 | 6,280 | 2.50 | B+ |
| Example 28 | Preparation example 28 | Synthesis example A-1 + C-wax | 95.00 | Synthesis example B-1 | 6,280 | 5.00 | A |
| Example 29 | Preparation example 29 | Synthesis example A-1 + C-wax | 92.50 | Synthesis example B-1 | 6,280 | 7.50 | A |
| Example 30 | Preparation example 30 | Synthesis example A-1 + C-wax | 85.00 | Synthesis example B-1 | 6,280 | 15.00 | B+ |
| Example 31 | Preparation example 31 | Synthesis example A-1 + C-wax | 80.00 | Synthesis example B-1 | 6,280 | 20.00 | C |
| Example 32 | Preparation example 32 | Synthesis example A-1 + C-wax | 75.00 | Synthesis example B-1 | 6,280 | 25.00 | C |
| Example 33 | Preparation example 33 | Synthesis example A-1 + C-wax | 70.00 | Synthesis example B-1 | 6,280 | 30.00 | C |
| Example 34 | Preparation example 34 | Synthesis example A-1 + C-wax | 90.00 | Synthesis example B-2 | 6,990 | 10.00 | C |
| Example 35 | Preparation example 35 | Synthesis example A-1 + C-wax | 90.00 | Synthesis example B-3 | 7,035 | 10.00 | B+ |
| Example 36 | Preparation example 36 | Synthesis example A-1 + C-wax | 90.00 | Synthesis example B-4 | 7,772 | 10.00 | B |

Evaluation of curable composition (Part 2-2)

| | Rheology control agent | Diamide compound (A) and/or hydrogenated castor oil (A') | | Polyamide compound (B) or polyamide compound (B') | | | Low-temperature activation evaluation |
|---|---|---|---|---|---|---|---|
| | | Type | Formulation amount/ mass % | Type | Mw | Formulation amount/ mass % | |
| Example 37 | Preparation example 37 | Synthesis example A-1 + C-wax | 90.00 | Synthesis example B-5 | 6,975 | 10.00 | B+ |
| Example 38 | Preparation example 38 | Synthesis example A-1 + C-wax | 90.00 | Synthesis example B-6 | 3,728 | 10.00 | A |
| Example 39 | Preparation example 39 | Synthesis example A-1 + C-wax | 90.00 | Synthesis example B-7 | 12,912 | 10.00 | B+ |
| Example 40 | Preparation example 40 | Synthesis example A-1 + C-wax | 90.00 | Synthesis example B-8 | 16,862 | 10.00 | C |
| Example 41 | Preparation example 41 | Synthesis example A-1 + C-wax | 90.00 | Synthesis example B-9 | 20,381 | 10.00 | C |
| Example 42 | Preparation example 42 | Synthesis example A-1 + C-wax | 90.00 | Synthesis example B-11 | 4,728 | 10.00 | A |
| Example 43 | Preparation example 43 | Synthesis example A-1 + C-wax | 90.00 | Synthesis example B-12 | 8,031 | 10.00 | C |
| Example 44 | Preparation example 44 | Synthesis example A-1 + C-wax | 90.00 | Synthesis example B-13 | 5,132 | 10.00 | C |
| Example 45 | Preparation example 45 | Synthesis example A-5 + C-wax | 90.00 | Synthesis example B-1 | 6,280 | 10.00 | A |
| Example 46 | Preparation example 46 | Synthesis example A-6 + C-wax | 90.00 | Synthesis example B-1 | 6,280 | 10.00 | B |
| Example 47 | Preparation example 47 | Synthesis example A-7 + C-wax | 90.00 | Synthesis example B-1 | 6,280 | 10.00 | B |
| Example 48 | Preparation example 48 | C-wax | 90.00 | Synthesis example B-1 | 6,280 | 10.00 | A |

Evaluation of curable composition (Part 2-3)

| | Rheology control agent | Diamide compound (A) and/or hydrogenated castor oil (A') | | Polyamide compound (B) or polyamide compound (B') | | | Low-temperature activation evaluation |
|---|---|---|---|---|---|---|---|
| | | Type | Formulation amount/ mass % | Type | Mw | Formulation amount/ mass % | |
| Example 49 | Preparation example 49 | Synthesis example A-1 + C-wax | 90.00 | Synthesis example B-1 | 6,280 | 10.00 | A |
| Example 50 | Preparation example 50 | Synthesis example A-1 + C-wax | 90.00 | Synthesis example B-1 | 6,280 | 10.00 | A |

TABLE 7-continued

| Example 51 | Preparation example 51 | Synthesis example A-1 + C-wax | 90.00 | Synthesis example B-1 | 6,280 | 10.00 | A |
| Example 52 | Preparation example 52 | Synthesis example A-1 + C-wax | 90.00 | Synthesis example B-1 | 6,280 | 10.00 | B+ |
| Example 53 | Preparation example 53 | Synthesis example A-1 + C-wax | 90.00 | Synthesis example B-1 | 6,280 | 10.00 | B+ |
| Example 54 | Preparation example 54 | Synthesis example A-1 + C-wax | 90.00 | Synthesis example B-1 | 6,280 | 10.00 | B+ |
| Example 55 | Preparation example 55 | Synthesis example A-1 + C-wax | 90.00 | Synthesis example B-1 | 6,280 | 10.00 | B |
| Example 56 | Preparation example 56 | Synthesis example A-1 + C-wax | 90.00 | Synthesis example B-1 | 6,280 | 10.00 | B |
| Comparative example 1 | Comparative preparation example 1 | Synthesis example A-1 | 99.00 | Synthesis example B-1 | 6,280 | 1.00 | D |
| Comparative example 2 | Comparative preparation example 2 | Synthesis example A-1 | 70.00 | Synthesis example B-1 | 6,280 | 30.00 | D |
| Comparative example 3 | Comparative preparation example 3 | Synthesis example A-1 | 90.00 | Comparative synthesis example B-1 | 21,330 | 10.00 | D |
| Comparative example 4 | Comparative preparation example 4 | Synthesis example A-1 + C-wax | 90.00 | Comparative synthesis example B-1 | 21,330 | 10.00 | D |

[Evaluation Method]

The curable compositions of Examples 1 to 56 and Comparative Examples 1 to 4 obtained as described above were evaluated for low-temperature activation. In the low-temperature activation evaluation, the viscosity was measured using a rheometer, and the viscosity at a shear rate of $1.0 \text{ s}^{-1}$ was used as a measured value.

(Low-Temperature Activation Evaluation)

The low-temperature activation effect was evaluated as follows. First, for each of the curable compositions of Examples 1 to 56 and Comparative Examples 1 to 4, a reference sample containing no polyamide compound (B) or polyamide compound (B') (that is, a sample having the same composition as that of the curable compositions of Examples 1 to 56 and Comparative Examples 1 to 4 except that the rheology control agent contains only the diamide compound (A) and/or the hydrogenated castor oil (A')) was prepared. Next, a viscosity (hereinafter, referred to as an "initial viscosity $V_0$") of each curable composition was measured on the day after production. Further, a relative value (hereinafter, referred to as a "viscosity index $I_1$") of the initial viscosity $V_0$ of each curable composition to the viscosity of each reference sample using the same diamide compound (A) and/or the hydrogenated castor oil (A') as those in the curable composition, taken as 100, was obtained to evaluate low-temperature activation effect according to the criteria described below. The viscosity index $I_1$ being 100 means that the initial viscosity $V_0$ of the curable composition was the same as (had no change from) the viscosity of the reference sample using the same diamide compound (A) or hydrogenated castor oil (A') as that of the curable composition. The greater the viscosity index $I_1$, the higher the low-temperature activation effect.

A: Viscosity index $I_1$ is more than 115
B+: Viscosity index $I_1$ is more than 110 and 115 or less
B: Viscosity index $I_1$ is more than 105 and 110 or less
C: Viscosity index $I_1$ is more than 100 and 105 or less
D: Viscosity index $I_1$ is 100 or less

[Evaluation Results]

Tables 6 and 7 show the evaluation results for the low-temperature activation evaluated as described above.

As seen from Tables 6 and 7, the curable compositions of Examples 1 to 56 have fair (grade C) or higher results in the low-temperature activation effect.

In the composition of the rheology control agent composed of the diamide compound (A) and the polyamide compound (B), comparisons among Examples 1 to 7 and Comparative Examples 1 and 2 show that the low-temperature activation effect is fair (grade C) or higher when the formulation amount of the polyamide compound (B) is 2.5 mass % or more and 25 mass % or less, and good (grade B) when the formulation amount of the polyamide compound (B) is 5 mass % or more and 10 mass % or less. Further, in the composition of the rheology control agent containing the hydrogenated castor oil (A'), comparisons among Examples 25 to 33 and 48 show that the low-temperature activation effect is fair (grade C) or higher when the formulation amount of the polyamide compound (B) is 1 mass % or more and 30 mass % or less, very good (grade B+) or higher when the formulation amount of the polyamide compound (B) is 2.5 mass % or more and mass % or less, and excellent (grade A) when the formulation amount of the polyamide compound (B) is 5 mass % or more and 10 mass % or less.

In the composition of the rheology control agent composed of the diamide compound (A) and the polyamide compound (B), comparisons among Examples 1 and 13 to 16 and Comparative Example 3 show that the low-temperature activation effect is fair (grade C) or higher when the weight-average molecular weight Mw of the polyamide compound (B) is 2,000 or more and 21,000 or less, and good (grade B) when the weight-average molecular weight Mw of the polyamide compound (B) is 3,000 or more and 13,000 or less. Further, in the composition of the rheology control agent containing the hydrogenated castor oil (A'), comparisons among Examples 25, 38 to 41 and 48 and Comparative Example 4 show that the low-temperature activation effect is fair (grade C) or higher when the weight-average molecular weight Mw of the polyamide compound (B) is 2,000 or more and 21,000 or less, very good (grade B+) or higher when the weight-average molecular weight Mw of the polyamide compound (B) is 3,000 or more and 13,000 or less, and excellent (grade A) when the weight-average molecular weight Mw of the polyamide compound (B) is 3,500 or more and 6,500 or less.

In addition, comparisons between Comparative Example 1 and Example 26, Comparative Example 2 and Example 33, Example 2 and Example 27, Example 5 and Example 30, Example 1, Example 25 and Example 48, Example 3 and Example 28, Example 4 and Example 29, Example 13 and Example 38, and the like show that the low-temperature activation effect is higher when the rheology control agent contains the hydrogenated castor oil (A') than when it contains no hydrogenated castor oil (A'). In particular, comparisons among Examples 1, 25, 48 and 49 to 56 show that the low-temperature activation effect is very good (grade B+) or higher and excellent (grade A) when the hydrogenated castor oil (A') content is 10 mass % or more and 25 mass % or more, respectively, relative the total amount of the diamide compound (A) and the hydrogenated castor oil (A') as 100 mass %.

Further, comparisons among Examples 1 and 21 to 24 show that the low-temperature activation effect is fair (grade C) or higher when the diamine component (A1) has 2 to 12 carbon atoms, and good (grade B) or higher when the diamine component (A1) has 2 to 8 carbon atoms.

Further, comparisons among Examples 1, 13, 17, 19, and the like show that the low-temperature activation effect is higher in Examples 1, 13, 17, and the like in which the carboxylic acid component (B2) contains polymerized fatty acids (dimer acids or trimer acids) than in Example 19 in which the carboxylic acid component (B2) contains fatty acids other than polymerized fatty acids (adipic acids).

Further, comparisons among Examples 1, 13, 14 and 18 (all of which have the weight-average molecular weight Mw in a range of 3,000 or more and 13,000 or less, exhibiting high effect of low-temperature activation) show that the low-temperature activation effect is higher in Examples 1, 13 and 14 in which the reaction molar ratio (B1/B2) between the amine component (B1) and the carboxylic acid component (B2) is less than 1 than in Example 18 in which the molar ratio (B1/B2) is over 1.

The invention claimed is:

1. A rheology control agent for a curable composition, the rheology control agent comprising:
a diamide compound (A) and/or a hydrogenated castor oil (A'), the diamide compound (A) being obtained by condensation reaction between a diamine component (A1) and a monocarboxylic acid component (A2), the diamine component (A1) being selected from the group consisting of diamines with 2 to 12 carbon atoms, and the monocarboxylic acid component (A2) being selected from the group consisting of hydrogenated castor oil fatty acids and linear saturated fatty acids; and
a polyamide compound (B) obtained by polycondensation of an amine component (B1) and a carboxylic acid component (B2), wherein
the amine component (B1) contains at least one amine selected from the group consisting of diamines with 2 to 54 carbon atoms and triamines with 2 to 54 carbon atoms,
the carboxylic acid component (B2) contains at least one carboxylic acid selected from the group consisting of dicarboxylic acids with 4 to 54 carbon atoms and tricarboxylic acids with 4 to 54 carbon atoms,
the polyamide compound (B) is a polyamide obtained by polycondensation of at least one of the amine component (B1) containing polymerized fatty acid derivatives and the carboxylic acid component (B2) containing polymerized fatty acids,
the polyamide compound (B) has a weight-average molecular weight of 5,132 or more and 21,000 or less, and
a cured product of the curable composition is used for a sealant or an adhesive.

2. The rheology control agent according to claim 1, wherein the rheology control agent contains 1 mass % or more and 50 mass % or less of the polyamide compound (B) when a total amount of the polyamide compound (B) and at least one of the diamide compound (A) and the hydrogenated castor oil (A') is 100 mass %.

3. The rheology control agent according to claim 1, wherein the diamine component (A1) is a diamine with 2 to 8 carbon atoms.

4. The rheology control agent according to claim 1, wherein the rheology control agent contains at least the hydrogenated castor oil (A').

5. The rheology control agent according to claim 4, wherein a content of the hydrogenated castor oil (A') is 10 mass % or more when a total amount of the diamide compound (A) and the hydrogenated castor oil (A') is 100 mass %.

6. The rheology control agent according to claim 1, wherein the carboxylic acid component (B2) contains at least polymerized fatty acids.

7. The rheology control agent according to claim 1, wherein a reaction molar ratio (B1/B2) between the amine component (B1) and the carboxylic acid component (B2) is less than 1.

8. A curable composition comprising:
a rheology control agent for a curable composition; and
a binder,
the rheology control agent comprising:
a diamide compound (A) and/or a hydrogenated castor oil (A'), the diamide compound (A) being obtained by condensation reaction between a diamine component (A1) and a monocarboxylic acid component (A2), the diamine component (A1) being selected from the group consisting of diamines with 2 to 12 carbon atoms, and the monocarboxylic acid component (A2) being selected from the group consisting of hydrogenated castor oil fatty acids and linear saturated fatty acids; and
a polyamide compound (B) obtained by polycondensation of an amine component (B1) and a carboxylic acid component (B2), wherein
the amine component (B1) contains at least one amine selected from the group consisting of diamines with 2 to 54 carbon atoms and triamines with 2 to 54 carbon atoms,
the carboxylic acid component (B2) contains at least one carboxylic acid selected from the group consisting of dicarboxylic acids with 4 to 54 carbon atoms and tricarboxylic acids with 4 to 54 carbon atoms,
the polyamide compound (B) is a polyamide obtained by polycondensation of at least one of the amine component (B1) containing polymerized fatty acid derivatives and the carboxylic acid component (B2) containing polymerized fatty acids,
the polyamide compound (B) has a weight-average molecular weight of 5,132 or more and 21,000 or less, and
a cured product of the curable composition is used for a sealant or an adhesive.

9. The curable composition according to claim 8, wherein the curable composition contains 1 mass % or more and 50 mass % or less of the polyamide compound (B) when a total amount of the polyamide compound (B) and at least one of the diamide compound (A) and the hydrogenated castor oil (A') is 100 mass %.

10. The curable composition according to claim 8, wherein the diamine component (A1) is a diamine with 2 to 8 carbon atoms.

11. The curable composition according to claim 8, wherein the curable composition contains at least the hydrogenated castor oil (A').

12. The curable composition according to claim 11, wherein a content of the hydrogenated castor oil (A') is 10 mass % or more when a total amount of the diamide compound (A) and the hydrogenated castor oil (A') is 100 mass %.

13. The curable composition according to claim 8, wherein the carboxylic acid component (B2) contains at least polymerized fatty acids.

14. The curable composition according to claim 8, wherein a reaction molar ratio (B1/B2) between the amine component (B1) and the carboxylic acid component (B2) is less than 1.

15. The rheology control agent according to claim 1, wherein the polyamide compound (B) has the weight-average molecular weight of 6,280 or more and 21,000 or less.

16. The curable composition according to claim 8, wherein the polyamide compound (B) has the weight-average molecular weight of 6,280 or more and 21,000 or less.

* * * * *